United States Patent Office 3,542,538
Patented Nov. 24, 1970

3,542,538
METHOD OF RETARDING PLANT GROWTH WITH HETEROCYCLIC QUATERNARY AMMONIUM SALTS
Johann Jung, Limburgerhof, Pfalz, and Heinrich Scholz, Ludwigshafen (Rhine), Germany, assignors to Badische Anilin- & Soda-Fabrik Aktiengesellschaft Ludwigshafen (Rhine), Germany
No Drawing. Filed Dec. 22, 1967, Ser. No. 692,675
Claims priority, application Germany, Jan. 4, 1967, B 90,597
Int. Cl. A01n 5/00, 9/12, 9/22
U.S. Cl. 71—76                                    3 Claims

ABSTRACT OF THE DISCLOSURE

Agents for retarding the growth of plants and changing their habits which contain a compound having the formula

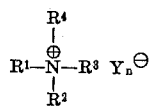

in which $R^1$ and $R^2$ denote an alkyl radical, in particular a lower alkyl radical, for example a methyl or ethyl radical, $R^1$ and $R^2$ together denote an alkylene radical, in particular a butylene or hexylene radical or, together with the nitrogen atom whose substituents they are, a morpholine radical, $R^3$ and $R^4$ denote a methyl, ethyl or propyl radical which may be substituted by chlorine or hydroxy, $R^4$ also denotes the

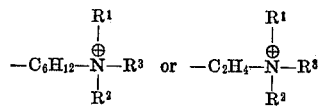

radical and $R^3$ and $R^4$ together denote the

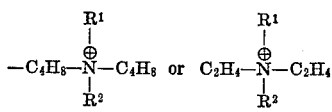

radical or, together with the nitrogen atom whose substituents they are, a morpholine, 2,6-dimethylmorpholine or thiomorpholine radical, $R^1$, $R^2$ and $R^3$ having the meanings given above, Y denotes an anion and $n$ denotes the integer 1 or 2. The agents improve the standing ability of cereals.

The present invention relates to agents for retarding the growth of plants and changing their habit which contain quaternary ammonium compounds.

It is known that chlorocholine chloride (CCC) may be used to regulate the growth height of wheat. It is also known that N-dimethlaminosuccinamic acid may be used for regulating the growth height of tomato plants. However their actions are not satisfactory.

An object of the present invention is to provide agents for retarding the growth of plants and changing their habit, sturdy plants thereby being obtained which are better able to withstand adverse weather conditions. Another object of the invention is to provide a process for retarding the growth of plants and changing their habit so that plants with valuable properties are obtained.

These and other objects of the invention are achieved with compounds having the formula

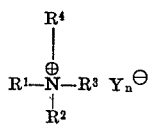

in which $R^1$ and $R^2$ denote an alkyl radical, in particular a lower alkyl radical, for example a methyl or ethyl radical $R^1$ and $R^2$ together denote an alkylene radical, in particular a butylene or hexylene radical or, together with the nitrogen atom whose substituents they are, a morpholine radical, $R^3$ and $R^4$ denote a methyl, ethyl or propyl radical which may be substituted by chlorine or hydroxy, $R^4$ also denotes the

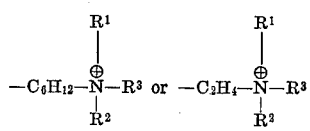

radical and $R^3$ and $R^4$ together denote the

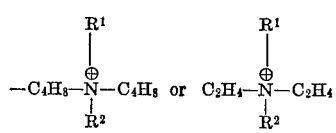

radical or, together with the nitrogen atom whose substituents they are, a morpholine, 2,6-dimethylmorpholine or thiomorpholine radical, $R^1$, $R^2$ and $R^3$ having the meanings given above, Y denotes an anion and $n$ denotes the integer 1 or 2. The plants exhibit sturdier growth and the color of the foliage is observed to be darker.

The agents according to the invention may for example be sprayed on the foliage or the soil, incorporated into the soil or the seed may be treated with them.

The action of the agents is determined substantially by the cation so that Y may denote any anion, for example chloride, bromide, p-toluenesulfonate, sulfate or phospate. The value of $n$ depends on the number of quaternary nitrogen atoms in the cation.

The active ingredients may be prepared for example as follows:

Morpholine or piperazine is reacted with alkylating agents, e.g. alkyl halides or alkyl sulfates. Alternatively water may be eliminated from N-alkyl-N,N-di-(2-hydroxyalkyl)-amines, for example by the action of concentrated sulfuric acid, and the morpholine derivative thus obtained may be alkylated, for example with an alkyl halide, to the corresponding quaternary compound. Similarly 2,2'-dichlorodialkyl ethers may be reacted with alkylamines in the presence of acid-binding agents to yield morpholine derivatives which can then be alkylated with alkylating agents, e.g. alkyl halides, to the corresponding quaternary compounds.

The active ingredients may also be prepared by reacting an aliphatic secondary monoamine or a saturated nitrogenous heterocyclic compound (e.g. piperidine or a homolog thereof) with a dihaloalkyl compound. In the case of these monoamines alkylation in the first step yields the tertiary amine and further alkylation in the second step gives the corresponding quaternary compound. Tertiary diamines may also be used as the starting materials which when reacted with dihaloalkyl compounds are alkylated to the corresponding quaternary compounds. One or both nitrogen atoms of the diamine may be converted to the quaternary form. For example by reacting tetramethylethylenediamine with 1,2-dichloroethane a compound having the formula

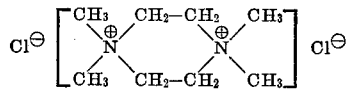

is obtained, and by reacting 2 moles of dimethylamine with 2 moles of 1,4-dichlorobutane a compound having the formula

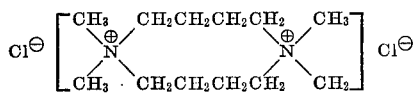

is obtained.

The following example illustrates the method of preparation. 990 parts (by weight) of hexamethylenimine is heated up to 130° C. in a heatable stirred vessel. Then in the course of two hours 318 parts of 1,4-dichlorobutane is pumped in steadily and the mixture is kept at 130° C. for one hour.

The reaction mixture is neutralized with a solution of methanol containing 30% by weight of sodium methoxide, the precipitated sodium chloride is separated by filtration and excess methanol and hexamethylenimine are separated by distillation. The crystallized quaternary salt is obtained in good yield from the residue by recrystallization from acetonitrile. The compound has the following structural formula:

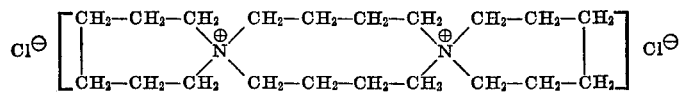

The following are examples of the active ingredients:

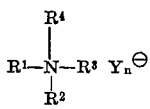

The agents for regulating plant growth according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, aqueous solutions, if desired with the addition of wetting agents, are suitable. However hydrocarbons, such as tetrahydronaphthalene, and alkylated naphthalenes may also be used as spray liquors.

Dusts may be prepared by mixing or grinding the active ingredients with a solid carrier. The activity of the agents may be extended by mixing them with plant protection agents.

The active ingredients may also be used in the form of a composition with fertilizers, for example in the form of fertilizers into which the active ingredients have been incorporated.

The following examples illustrate the action of the agents according to the invention.

EXAMPLE 1

Wheat grains of the "Heines Koga" species were sown in glass vessels having a diameter of 11.5 cm. (Neubauer dishes) in loamy sandy soil which had been supplied with adequate amounts of nutrients beforehand. On the day of sowing, the active ingredients were sprayed on the surface of the soil, each at the rate of 3 mg./dish, which is equivalent to 3 kg./ha. The following results were observed after four weeks.

| | $R^1$ | $R^2$ | $R^3$ | $R^4$ | Y | $n$ | $n_D^{20}$ |
|---|---|---|---|---|---|---|---|
| I | $-CH_3$ | $-CH_3$ | $-C_2H_4OH$ | $-C_2H_4Cl$ | Cl | 1 | (¹) |
| II | $-CH_3$ | $-CH_3$ | $-C_2H_4-O-C_2H_4-$ | | Cl | 1 | 1.554 |
| III | $-C_4H_8-$ | $C_2H_4Cl$ | $-C_6H_{12}\overset{\oplus}{N}=C_4H_8$ $\overset{\|}{C_2N_4Cl}$ | | Cl | 2 | 1.543 |
| IV | $-CH_3$ | $-CH_3$ | $-C_4H_8-\overset{CH_3}{\underset{CH_3}{\overset{\|}{\underset{\|}{N^\oplus}}}}-C_4H_8-$ | | Cl | 2 | 1.530 |
| V | $CH_3$ | $-CH_3$ | $-C_2H_4-\overset{CH_3}{\underset{CH_3}{\overset{\|}{\underset{\|}{N^\oplus}}}}-C_2H_4-$ | | Cl | 2 | 1.635 |
| VI | $-C_6H_{12}-$ | | $-C_4H_8-\overset{\oplus}{N}-C_6H_{12}-C_4H_8-$ | | Cl | 2 | 1.538 |
| VII | $-C_6H_{12}-$ | | $-C_2H_4-\overset{\oplus}{N}=C_6H_{12}-C_2H_4-$ | | Cl | 2 | 1.540 |
| VIII | $-C_2H_5$ | $-C_2H_5$ | $C_2H_4-\overset{\oplus}{N}\overset{C_2H_5}{\underset{C_2H_5}{\diagdown}}-C_2H_4-$ | | Cl | 2 | 1.550 |
| IX | $-C_4H_9$ | $-C_4H_9$ | $-C_2H_4-\overset{\oplus}{N}\overset{C_4H_9}{\underset{C_4H_9}{\diagdown}}-C_2H_4-$ | | Cl | 2 | 1.528 |
| X | $-C_4H_8-$ | $C_4H_9$ | $-C_2H_4Cl$ | | Cl | 1 | 1.534 |
| XI | $-C_2H_4-O-C_2H_4-$ | $-CH_3$ | $-C_2H_4-\overset{\oplus}{N}\overset{CH_3}{\underset{C_2H_4}{\diagdown}}-C_2H_4-O$ | | Cl | 2 | 1.529 |

¹ Mp.=148°C.

EFFECT ON GROWTH HEIGHT OF WHEAT
[Soil treatment in Neubauer dishes]

| Active ingredient | Plant height | |
| --- | --- | --- |
| | In cm. | Relative |
| Experiment 1: | | |
| Control (untreated) | 21.2 | 100 |
| CCC | 15.0 | 70.8 |
| II | 12.5 | 59.0 |
| IV | 13.3 | 62.7 |
| Experiment 2: | | |
| Control (untreated) | 19.5 | 100 |
| CCC | 14.7 | 75.4 |
| II | 14.1 | 72.3 |

Active ingredients I and III have the same biological action as II and IV.

EXAMPLE 2

Four experiments were carried out with spring barely of the "Breuns Wisa" species under the same conditions as in Example 1, except that different rates of application of the active ingredients were used. The following results were observed after four weeks.

EFFECT ON GROWTH HEIGHT OF SPRING BARLEY
[Soil treatment in Neubauer dishes]

| Active ingredient | Rate of application, kg./ha. | Plant height | |
| --- | --- | --- | --- |
| | | In cm. | Relative |
| Experiment 1: | | | |
| Control (untreated) | | 31.4 | 100 |
| CCC | 3 | 31.1 | 99.8 |
| CCC | 12 | 30.4 | 96.3 |
| II | 3 | 27.4 | 87.3 |
| II | 12 | 25.3 | 80.6 |
| Experiment 2: | | | |
| Control (untreated) | | 20.9 | 100 |
| CCC | 12 | 17.4 | 83.3 |
| II | 12 | 15.5 | 7492 |
| IV | 12 | 16.5 | 78.9 |
| Experiment 3: | | | |
| Control (untreated) | | 20.5 | 100 |
| I | 12 | 17.7 | 86.3 |
| II | 12 | 16.0 | 78.0 |
| IV | 12 | 16.9 | 82.4 |
| Experiment 4: | | | |
| Control (untreated) | | 21.0 | 100 |
| CCC | 3 | 16.2 | 77.1 |
| II | 3 | 15.4 | 73.3 |

Active ingredients III, V, VI, VII, VIII and XI exhibit the same biological action as I, II and IV.

EXAMPLE 3

Barely plants of the "Breuns Wisa" species were sprayed in conventional manner at a growth height of about 10 cm. with the active ingredients (rate of application: 2 kg./ha. of active ingredient). The action of the substances applied via the foliage can be seen from the following results.

EFFECT ON GROWTH HEIGHT OF SPRING BARLEY
[Foliar treatment in Neubauer dishes]

| Active ingredient: | Plant height | |
| --- | --- | --- |
| | In cm. | Relative |
| Control (untreated) | 30.1 | 100 |
| CCC | 29.8 | 99.0 |
| II | 26.9 | 89.4 |

EXAMPLE 4

In order to determine the effect of the various active ingredients on spring barley up to the point where the plants have reached maturity, a pot experiment was carried out in conventional manner using Mitscherlich containers (active ingredients sprayed on foliage of plants; rate of application: 3 kg./ha. of active ingredient). Neutral, loamy sandy soil was used (fertilized with 1 g. of N as ammonium nitrate and 1 g. of $P_2O_5$ as secondary potassium phosphate per container). The following figures indicate the length of the stalks of the plants when ready for harvesting.

EFFECT OF STALK LENGTH OF SPRING BARLEY
[Foliar treatment in Mitscherlich containers]

| Active ingredient: | Plant height | |
| --- | --- | --- |
| | In cm. | Relative |
| Control (untreated) | 82.8 | 100 |
| CCC | 83.3 | 100.6 |
| II | 77.1 | 93.1 |

EXAMPLE 5

An experiment with spring rye of the "Petkus" species was carried out in Mitscherlich containers under the same conditions as in Example 4 with the following results.

EFFECT OF STALK LENGTH OF SPRING RYE
[Foliar treatment in Mitscherlich containers]

| Active ingredient: | Rate of application kg./ha. | Plant height | |
| --- | --- | --- | --- |
| | | In cm. | Relative |
| Control (untreated) | | 154.5 | 100 |
| CCC | 3 | 141.4 | 91.5 |
| IV | 3 | 135.5 | 87.7 |

EXAMPLE 6

Tomato plants of the "M/M" species were treated at a growth height of about 12 cm. in ordinary flower-pots in a greenhouse with N-dimethylaminosuccinamic acid (A) and active ingredient II via the soil and the foilage at various rates of application. Four weeks later the height of the plants was measured and these figures appear below.

EFFECT ON GROWTH HEIGHT OF TOMATOES
[Soil and foliar treatment in flower-pots in greenhouse]

| | Plant height | |
| --- | --- | --- |
| | In cm. | Relative |
| Control (untreated) | 30.2 | 100 |
| Active ingredient A. | | |
| Soil treatment with 5 mg | 29.1 | 96.4 |
| Soil treatment with 15 mg | 29.3 | 97.0 |
| Soil treatment with 30 mg | 25.0 | 82.8 |
| Foliar treatment with 5 mg | 21.0 | 69.5 |
| Active ingredient II. | | |
| Soil treatment with 5 mg | 26.9 | 89.1 |
| Soil treatment with 15 mg | 25.3 | 83.8 |
| Soil treatment with 30 mg | 20.3 | 67.2 |
| Foliar treatment with 5 mg | 21.6 | 71.5 |

We claim:
1. A method of retarding the growth of plants which comprises treating said plants with a growth regulating amount of a compound selected from the group consisting of

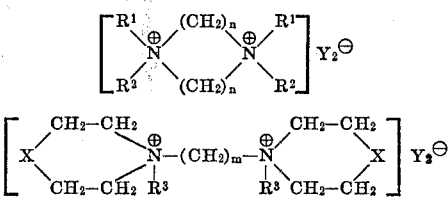

and

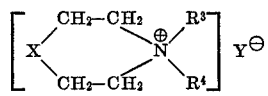

in which $R^1$ and $R^2$ denote alkyl of 1 to 4 carbon atoms and further members in which $R^1$ and $R^2$ taken together denote polymethylene of 4 to 6 carbon atoms, $n$ denotes an integer of 2 to 4, $R^3$ and $R^4$ denote alkyl of 1 to 3 carbon atoms, chloroalkyl of 1 to 3 carbon atoms or hydroxyalkyl of 1 to 3 carbon atoms, X denotes oxygen or a single bond, $m$ is a member of the group consisting of 2 and 6 and Y denotes an anion selected from the group consisting of chlorine, bromine, p-toluenesulfonate, sulfate and phosphate.

2. A method as claimed in claim 1 wherein the growth regulating compound has the formula

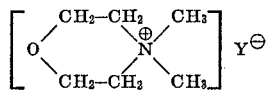

wherein Y denotes said anion.

3. A method as claimed in claim 1 wherein the growth regulating compound has the formula

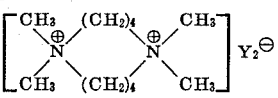

wherein Y denotes said anion.

References Cited
UNITED STATES PATENTS

| | | | |
|---|---|---|---|
| 3,156,554 | 11/1964 | Tolbert | 71—76 |
| 3,156,555 | 11/1964 | Tolbert | 71—76 |
| 3,395,009 | 7/1968 | Oettel et al. | 71—76 |
| 3,402,039 | 9/1968 | Mussell et al. | 71—76 |

OTHER REFERENCES

Krewson et al.: J. Agr. Food Chem. 7, 264–268 (1959).

LEWIS GOTTS, Primary Examiner

M. M. KASSENOFF, Assistant Examiner

U.S. Cl. X.R.

71—88, 90, 92, 94 95, 121; 260—239, 243, 247, 247.1, 247.7, 268, 326.5, 326.61, 326.8, 326.82

PO-1050
(5/69)

UNITED STATES PATENT OFFICE
CERTIFICATE OF CORRECTION

Patent No. 3,542,538        Dated November 24, 1970

Inventor(s) Johann Jung et al

It is certified that error appears in the above-identified patent and that said Letters Patent are hereby corrected as shown below:

Column 3, in the table, No. III, under "$R^2$", "$C_2H_4Cl$" should be under "$R^3$"; No. V, "$CH_3$" should read -- $-CH_3$ --; No. VIII,

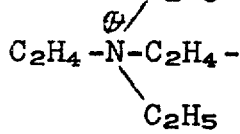     should read -- 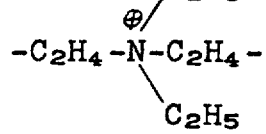 -- .

Column 5, line 34, "7492" should read -- 74.2 --; line 48, "Barely" should read -- Barley --; line 18, "barely" should read -- barley --.

Column 8, line 9, in the references, "(1959)" should read -- (1969) --.

SIGNED AND
SEALED
MAR 2 1971

(SEAL)
Attest:

Edward M. Fletcher, Jr.
Attesting Officer

WILLIAM E. SCHUYLER, JR.
Commissioner of Patents